United States Patent [19]
Takemoto et al.

[11] 3,806,751

[45] Apr. 23, 1974

[54] SEMICONDUCTOR TARGET IMAGE PICKUP TUBE FOR COLOR CAMERA OF SINGLE VALVE TYPE

[75] Inventors: Iwao Takemoto, Kodaira; Mikio Ashikawa, Koganei, both of Japan

[73] Assignee: Hitachi, Ltd., Tokyo, Japan

[22] Filed: Apr. 18, 1972

[21] Appl. No.: 245,055

[30] Foreign Application Priority Data

Apr. 21, 1971 Japan ............................... 46-25245

[52] U.S. Cl. ........ 313/66, 313/65 AB, 317/235 AN, 317/235 N, 317/235 NA

[51] Int. Cl. ......................... H01l 15/00, H01l 15/02

[58] Field of Search .......... 313/65 AB, 66; 317/235; 250/211 J

[56] References Cited

UNITED STATES PATENTS 3,458,782 7/1969 Buck et al. .................... 313/65 AB 3,633,077 1/1972 Tsuji ................................ 317/235

*Primary Examiner*—John Kominski

*Attorney, Agent, or Firm*—Craig and Antonelli

[57] ABSTRACT

A semiconductor target for use in a color camera of the single valve type comprising a substrate of n-type silicon having a resistivity of 10 Ωcm, a plurality of photo diodes arranged in a mosaic pattern on the side of the surface of the substrate which is scanned with an electron beam, a plurality of $n^+$-type regions several microns deep formed in a stripe-like pattern on the side of the light receiving surface of the substrate and having a surface impurity concentration of $10^{19}$ $cm^{-3}$, and a plurality of n-type dead layers each formed in the $n^+$-type region and having a surface impurity concentration less than $10^{18}$ $cm^{-3}$.

25 Claims, 8 Drawing Figures

SEMICONDUCTOR TARGET IMAGE PICKUP TUBE FOR COLOR CAMERA OF SINGLE VALVE TYPE

Figures 1A, 1B, 1C:
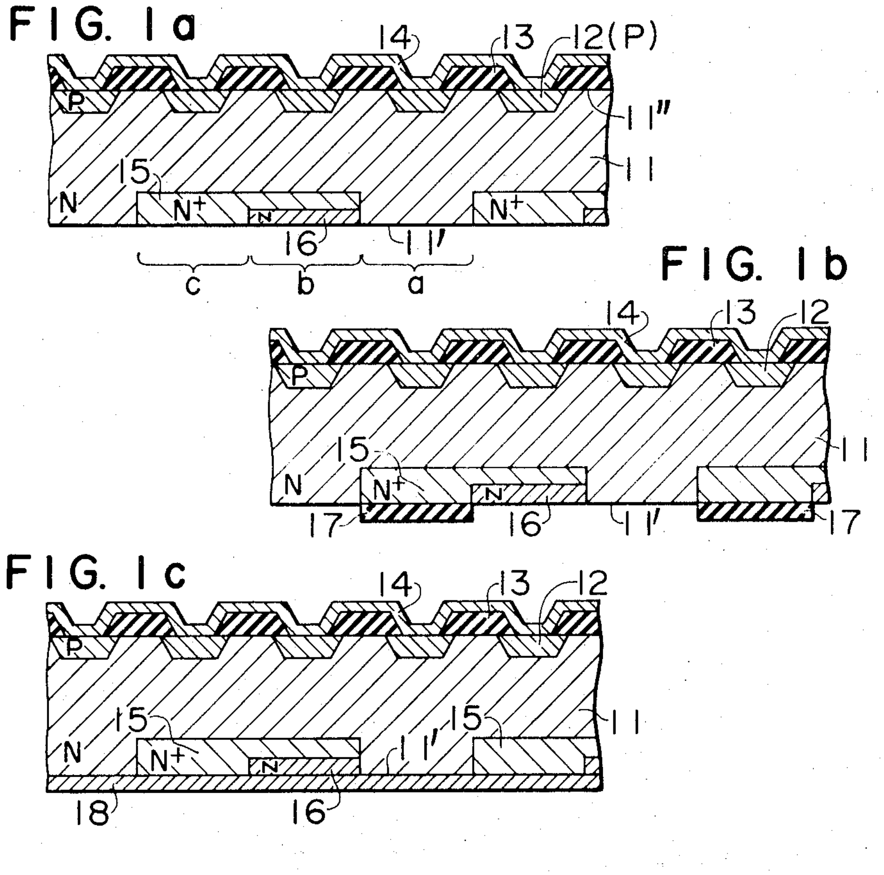

This invention relates to semiconductor silicon targets for image pickup tubes and more particularly to a silicon target for use in a color camera of the single valve type.

Conventional color cameras are proposed in a plurality of types including a type which employs three pickup tubes provided with optical filters for red, green and blue respectively for obtaining three primary color signals, and a type in which an optical stripe filter is mounted on the light receiving surface of a target.

In a pickup tube, very small element areas of an image projected upon the target by means such as an optical lens system are successively scanned by an electron beam of very small diameter for decomposing the image into many picture elements, and the relative brightness of the picture element is converted into an electrical signal. More precisely, a plurality of pn junction photo diodes or npn junction photo transistors are formed on the surface of the target scanned by the electron beam so that holes in the electron-hole pairs produced by the light signal applied to the light receiving surface of the target diffuse through the substrate to migrate toward the pn junctions, thence into the p-type regions by being attracted by the electric field in the depletion layer of the pn junctions, thereby increasing the potential of the p-type regions. This potential is lowered to the cathode potential again by the scanning beam and the current appearing at this time provides a picture signal.

Silicon is commonly used to form this target for many reasons described below. In the first place, any substantial sticking does not occur on the silicon target even when it is subject to light having a large intensity such as sunlight, or when a bright object is picked up, or when the same object is picked up over an extended period of time. Secondly, the silicon target is free from sticking due to the raster depicted by the electron beam. Thirdly, the silicon target is sufficiently resistive to heat, thereby permitting evacuation at high temperatures. Fourthly, the silicon target has a high sensitivity.

However, when an optical stripe filter is combined with such a semiconductor target according to conventional practice for the purpose of obtaining color signals, a space of at least one hundred microns is produced unavoidably between the surface of the target and the optical stripe filter in view of the structure of the semiconductor target. The presence of this space is undesirable in that the light beams of primary colors are scattered by this space resulting in a remarkable reduction in the resolution of the picture signal and in the light separating characteristic. Further, direct mounting of the stripe filter on the surface of the target is also undesirable in that the surface phenomenon peculiar to the semiconductor creates a dead region or layer which annihilates the holes produced by the light, resulting in impossibility of obtaining the desired sensitivity and light separating performance.

It is therefore an object of the present invention to provide an image pickup tube for a color camera of the single valve type which is free from the above defects and can produce primary color signals with high sensitivity.

Another object of the present invention is to provide an image pickup tube which is provided with a novel semiconductor target which can satisfactorily separate light into primary color components in spite of a simple structure.

A further object of the present invention is to provide a miniature image pickup tube which does not require any optical filter.

The present invention attaining the above objects is featured by the fact that a plurality of dead layers are arranged in a predetermined pattern on the light receiving surface of the substrate forming the semiconductor target.

The function of these dead layers is such that the holes produced in response to the application of light to the light receiving surface of the target are returned back to such surface of the substrate and are thus prevented from migrating deep into the substrate. Therefore, the pn junctions are not substantially affected by the component of light incident upon the dead layers, which component belongs to a short wave-length range and cannot penetrate deep into the substrate. Consequently, the dead layers have a very low sensitivity to the light component belonging to the short wavelength range. A plurality of stripes of such dead layers having varying sizes may be arranged on the light receiving surface of the substrate so as to reduce the sensitivity to wavelengths shorter than a desired wavelength range and derive solely the light component lying within the desired wavelength range with high sensitivity. In other words, these dead layers act virtually as an optical filter.

Figure 1D:
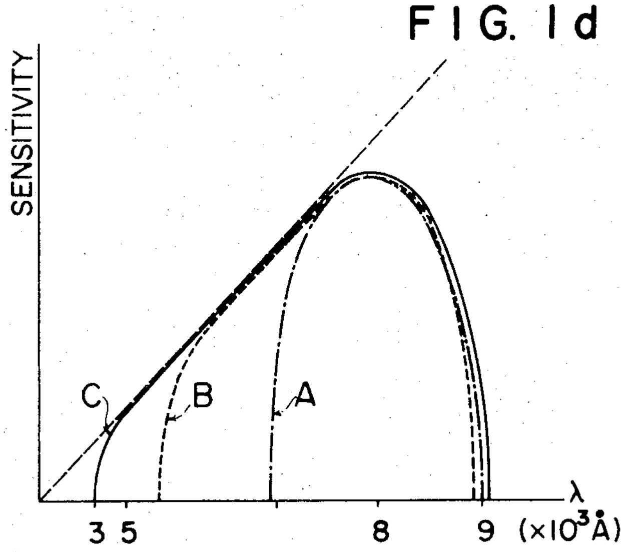
Figure 2A:
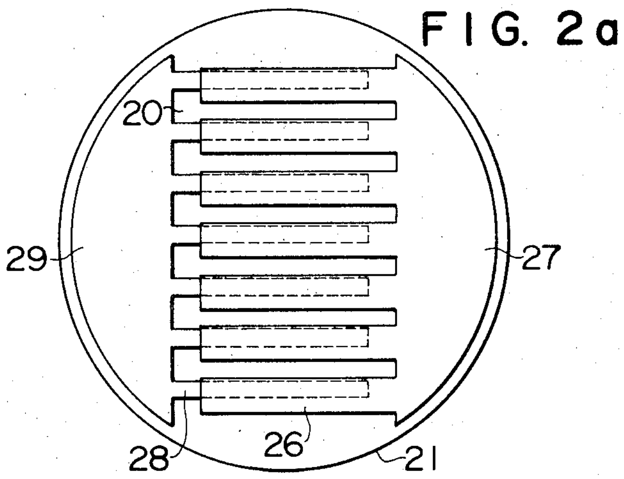
Figure 2B:
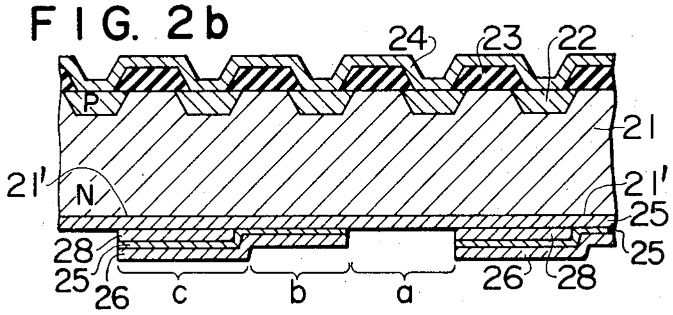
Figure 3A:
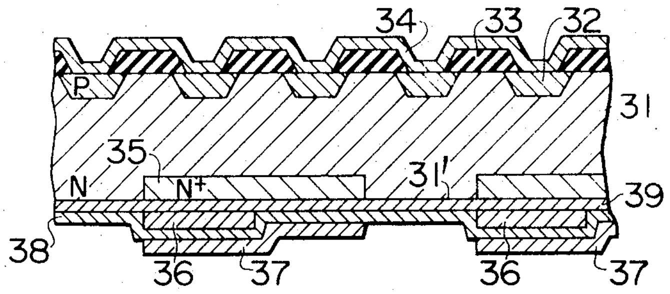
Figure 3B:
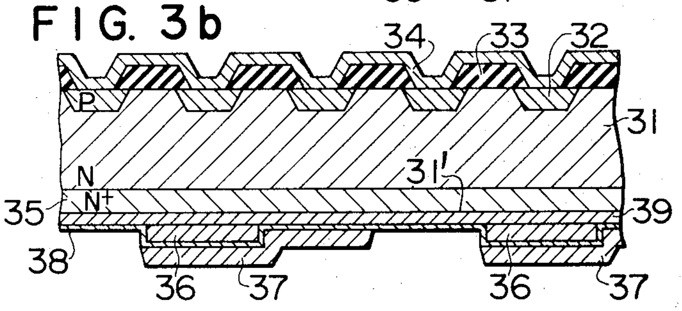

The above and other objects, features and advantages of the present invention will be apparent from the following detailed description of a few preferred embodiments thereof taken in conjunction with the accompanying drawings, in which:

FIG. 1*a* is a schematic sectional view of parts of an embodiment of the present invention, showing a target provided with a plurality of dead layers;

FIGS. 1*b* and 1*c* are views similar to FIG. 1*a*, but showing modifications of the target shown in FIG. 1*a*;

FIG. 1*d* is a graphic illustration of the light separating characteristics of the target shown in FIG. 1*a*;

FIGS. 2*a* and 2*b* are a plan and an enlarged schematic sectional view respectively of another embodiment of the present invention, showing a target provided with a plurality of transparent dead layers;

FIG. 3*a* is a schematic sectional view of parts of a further embodiment of the present invention; and FIG. 3*b* is a view similar to FIG. 3*a*, but showing a modification of the target shown in FIG. 3*a*.

Referring to FIG. 1*a* showing, in section, parts of a semiconductor target for use in a color camera of the single valve type embodying the present invention, the target comprises a single-crystalline substrate 11 of n-type silicon having a resistivity of 10 Ωcm. One of the major surfaces 11'' of the substrate 11, which is scanned by an electron beam, is formed thereinside with a plurality of p-type regions 12 which are arranged in a mosaic pattern in the same plane to correspond to individual picture elements. A protective oxide film 13 covers the major surface 11'', and a resistive film 14 of material such as antimony trisulfide ($Sb_2S_3$) is formed to cover the p-type regions 12 and the oxide film 13 for the purpose of preventing charge-up and improving the effect of electron beam landing. On the other hand, the othe major surface 11′ of the substrate 11, which is the light receiving surface, is formed thereinside with a plurality of $n^+$-type regions 15 and n-type reverse electric field regions 16. The $n^+$-type regions 15 may be formed by selectively doping the major surface 11′ of the substrate 11 with an n-type impurity such as phosphorus of high concentration. The n-type regions 16 may be formed by subjecting a portion of the $n^+$-type regions 15 to heat treatment at a high temperature using a mask of silicon dioxide for the out-diffusion of a portion of the impurity in the $n^+$-type regions 15 exteriorly to the substrate 11 thereby partly reducing the surface impurity concentration of the $n^+$-type regions 15. Thus, the major surface portion 11′ includes the $n^+$-type regions 15, the n-type regions 16 and the regions 11 which are not subjected to the impurity doping treatment. The regions 15, 16 and 11 are arranged to conform to a predetermined pattern which may be a stripe-like, mosaic or any other suitable pattern. In FIG. 1*a*, the region 15 constitutes a dead layer *c*, while the region 16 constitutes another dead layer *b*, and the exposed surface portion of the substrate 11 constitutes substantially a dead layer *a* as shown.

Suppose now that light is projected on the light receiving surface 11′ of the target. Holes (minority carriers) are produced in response to the light portion incident upon the dead layer *a*. However, almost all of the holes produced by the light components of short and medium wavelengths are returned back to the substrate surface 11′ and cannot reach the p-type regions 12 due to the fact that the resistivity of the substrate 11 is 10 Ωcm, no accelerating field is present and the depth of the dead layer *a* is as large as 1.0 to 1.6 microns. In other words, this dead layer *a* exhibits a poor light separating characteristic and the sensitive wavelength range lies on a long wavelength side with a peak at about 8,000 A. due to the fact that almost all of the holes produced by the light components of short and medium wavelengths are returned back to the surface 11′ of the substrate 11. The light separating performance of the dead layer *a* is shown by the one-dot chain curve A in FIG. 1*d* in which the horizontal axis represents the wavelength of light and the vertical axis represents the sensitivity to light. In the dead layer *a*, the short and medium wavelength components of light are removed as described and the sensitivity is represented by the one-dot chain curve A which has a peak at about 8,000 A.

The region 15 or dead layer *c* has a surface impurity concentration of the order of $10^{19}$ $cm^{-3}$. The impurity concentration of this dead layer *c* is gradually reduced toward the interior of the substrate 11, and therefore, the accelerating field is also correspondingly reduced toward the interior of the substrate 11. Thus, all the holes produced by the light portion entering this dead layer *c* migrate inwardly into the substrate 11 along such accelerating field and this dead layer *c* is virtually not present. The sensitivity of the dead layer *c* is shown by the solid curve C in FIG. 1*d*. It will be seen from FIG. 1*d* that this dead layer *c* can respond to light lying within a wide wavelength range of about 3,000 A. to 9,000 A. and thus has a high sensitivity.

The region 16 or dead layer *b* has a surface impurity concentration of the order of $10^{18}$ $cm^{-3}$ since it is subjected to heat treatment as described previously. Since the impurity concentration of this portion of the substrate 11 is highest at a point which is 0.1 to 0.5 micron deep from the substrate surface 11′, the depth of the dead layer *b* ranges from 0.1 to 0.5 micron. In other words, no accelerating field is present within a depth range of 0.1 to 0.5 micron in this dead layer *b*. The light separating characteristic of this dead layer *b* is shown by the dotted curve B in FIG. 1*d* in which it will be seen that its sensitivity is extremely low in the short wavelength range.

It will be understood from the above description that only one silicon target possesses three different kinds of light separating characteristics when the $n^+$-type and n-type regions 15 and 16 are formed in the light receiving surface 11′ of the silicon substrate 11 and the surface potential and the depth of the dead layers are suitably adjusted. The electrical signals derived from the silicon target of the above-described character may be suitably subjected to addition and subtraction in a known adding and subtracting circuit so as to obtain separately a red color signal, a green color signal and a blue color signal with high sensitivity. For example, the curve A above described is used intact in the case of red light. In the case of green light, the curve A is subtracted from the curve B and the result of subtraction is multiplied by a constant. In the case of blue light, the curve B is subtracted from the curve C and the result of subtraction is multiplied by a constant. In this manner, electrical signals representative of the three primary colors can be obtained.

FIG. 1*b* shows a modification of the structure shown in FIG. 1*a*. Referring to FIG. 1*b*, a film 17 of material such as silicon dioxide is provided on the surface of the dead layer *c* or $n^+$-type region 15 in FIG. 1*a* so as to improve the field distribution in the vicinity of the surface of the $n^+$-type region 15 thereby preventing an undesirable reduction in the sensitivity and improving the sensitivity to the light component of short wavelengths.

FIG. 1*c* shows another modification of the structure shown in FIG. 1*a*. Referring to FIG. 1*c*, the light receiving surface 11′ is entirely covered with a reflection preventive film 18 so as to further improve the sensitivity of the silicon target. Further, a p-type impurity such as boron may be diffused into the dead layers *a* and *b* so as to form a pn junction of shallow depth less than 0.5 micron therein. This is advantageous in that more marked differences can be produced between the light separating characteristics of the dead layers.

It is to be noted that the silicon target according to the present invention can satisfactorily pick up the image even when the oxide film 17, reflection protective film 18 and p-type layer are not provided. Further, these means may be suitably selectively combined as desired. Furthermore, while the dead layer *b* has been formed in the $n^+$-type region 15 in the embodiment shown in FIG. 1*a*, it will be understood that this dead layer *b* may be formed separately from the $n^+$-type region 15 by suitably diffusing an impurity.

FIGS. 2*a* and 2*b* are a plan and an enlarged schematic section respectively of another embodiment of the present invention in which the dead layers are in the form of electrodes. In FIGS. 2*a* and 2*b*, the parts designated by the reference numerals 21, 21′, 22, 23 and 24 correspond to the parts designated by the reference nuemrals 11, 11′, 12, 13 and 14 in FIG. 1*a*. Thus, the numerals 21, 21′, 22, 23 and 24 designate a silicon substrate, a light receiving surface of the substrate, p-type regions, an oxide film and a resistive film respectively.

In FIGS. 1*a* to 1*c*, the dead layers *b* and *c* are formed by diffusing an impurity into the semiconductor substrate, but in FIGS. 2*a* and 2*b*, no $n^+$-type regions are formed in the major surface or light receiving surface of the silicon substrate 21.

Referring to FIGS. 2*a* and 2*b*, a plurality of transparent electrodes 26 are arranged in a stripe-like pattern and are electrically connected to a transparent electrode 27. A plurality of transparent electrodes 28 having a width less than that of the electrodes 26 are also arranged in a stripe-like pattern and are electrically connected to a transparent electrode 29. These transparent electrodes 26, 27, 28 and 29, which may be tin oxide, are deposited on the light receiving surface 21' of the substrate 21 with the oxide film 25 interposed between the electrodes 26, 27 and the substrate 21 and between the electrodes 26, 27 and the electrodes 28, 29, and different voltages are applied to the electrodes 26 and 28 for forming dead layers on the light receiving surface 21' of the substrate 21 depending on the applied voltage. More precisely, a known voltage applying means (not shown) is connected to the electrode 27 for applying a positive voltage of 0 to 2 volts to the electrodes 26. Another voltage applying means (not shown) is connected to the electrode 29 for applying a positive voltage of 4 to 5 volts to the electrodes 28. The region in which the electrode 28 is not superposed by the electrode 26 corresponds to the dead layer *b* in FIG. 1*a* due to the fact that the magnitude of the accelerating field is small in this region. The region in which the electrodes 26 and 28 are superposed on each other corresponds to the dead layer *c* in FIG. 1*a* due to the fact that the magnitude of the accelerating field is large in this region. The region in which the electrodes 26 and 28 are not deposited on the substrate 21 corresponds to the dead layer *a* in FIG. 1*a*.

FIG. 3*a* is a schematic sectional view of parts of a further embodiment of the present invention. A plurality of p-type regions 32, an oxide film 33 and a resistive film are formed on the side of the surface of a substrate 31 which is scanned by an electron beam to provide a plurality of photo diodes. On the side of the light receiving surface 31' of the substrate 31, a plurality of $n^+$-type regions 35 are formed by diffusing an impurity into the susbtrate 31 until the surface impurity concentration attains the level of the order of $10^{17}$ $cm^{-3}$. An oxide film 39 about 1,000 A. thick is formed on the light receiving surface 31' of the substrate 31, and a plurality of transparent electrodes 36 of tin oxide are deposited on the oxide film 39. Another transparent electrode 37 of tin oxide is deposited on each of the electrodes 36 with an oxide film 38 interposed therebetween and has a width larger than that of the electrode 36 as shown.

FIG. 3*b* shows a modification of the structure shown in FIG. 3*a*. In FIG. 3*b*, the $n^+$-type region 35 is formed in the entire light receiving surface 31' of the substrate 31, and suitably selected voltages are applied to the transparent electrodes 36 and 37. The disposition of the electrodes 36 and 37 on the $n^+$-type region 35 and application of suitable voltages to these electrodes in the manner above described produces a depletion layer on the surface of the substrate 31 in contact with the oxide film 9 so that the magnitude of the accelerating field in the $n^+$-type region 35 can be easily controlled. The fact that the accelerating field can be controlled by the applied voltage provides the advantage in that the light separating performance can be easily controlled as desired after the target has been completed.

In the embodiments described with reference to FIGS. 2*a* to 3*b*, a structure including partly overlapping transparent electrodes has been illustrated by way of example. However, the present invention is in no way limited to such a structure and includes another structure in which such transparent electrodes are disposed in parallel without overlapping each other. It will be understood further that any suitable known means such as a reflection preventive film may be formed on the light receiving surface of the target for improving the image pickup efficiency.

In the embodiments of the present invention above described, a silicon target structure including three different dead layers has been illustrated by way of example. However, the present invention is in no way limited to such a specific structure and the structure may generally include any other suitable regions such as a brightness control region. It will be understood further that the dead layers may be arranged in a mosaic, reticular or dot-like pattern in lieu of the stripe-like pattern illustrated in the drawings.

It will be understood from the foregoing detailed description that the present invention provides a silicon target for use in an image pickup tube in which the surface potential at the light receiving surface thereof and the depth of the dead layers are suitably controlled so that the target exhibits three different kinds of light separating characteristics. According to the present invention, red, green and blue color signals can be easily obtained without using any color filters. More precisely, the red color signal can be obtained directly from the dead layer *a*, the green color signal can be obtained by subtracting the signal produced by the dead layer *a* from the signal produced by the dead layer *b*, and the blue color signal can be obtained by subtracting the signal produced by the dead layer *b* from the signal produced by the dead layer *c*.

Further, while an n-type semiconductor in the form of silicon has been illustrated, any other suitable n-type semiconductors may be used in lieu of silicon.

It will be appreciated that color picture signals can be derived from a color camera of the single valve type by virtue of the fact that the semiconductor target according to the present invention includes at least three different regions exhibiting different light separating characteristics.

What we claim is:

1. A semiconductor target for use in an image pickup tube for a color camera of the single valve type comprising:

an n-type semiconductor substrate having a predetermined impurity concentration;

a plurality of p-type regions arranged in a predetermined mosaic pattern on the side of the surface of said substrate which is scanned with an electron beam; and three groups of adjacent dead layers, different in depth, formed in a predetermined pattern on the side of the light receiving surface of said substrate, the first group of said dead layers being the dead layer of said n-type semiconductor substrate itself, the second group being respective n-type first regions each having an impurity concentration distribution which increases at first, reaches a peak point and then decreases gradually to the impurity concentration of said substrate, as measured from the light receiving surface toward the surface scanned with the electron beam, and the third group being respective n-type second regions each having an impurity concentration distribution which is greatest at said light receiving surface and decreases gradually with depth to the impurity concentration of said substrate, whereby the semiconductor target has three groups of regions having three different spectral sensitivities corresponding to said three groups of dead layers.

2. A semiconductor target as claimed in claim 1, in which said peak point lies at a position which is 0.1 to 0.5 micron deep from said substrate surface.

3. A semiconductor target as claimed in claim 2, in which said light receiving surface of said substrate is covered with a reflection preventive film.

4. A semiconductor target as claimed in claim 2, in which one of said first and second regions is further doped with a p-type impurity.

5. A semiconductor target as claimed in claim 1, in which one of said first and second regions is further doped with a p-type impurity.

6. A semiconductor target as claimed in claim 1, in which each said third group of dead layers is covered with an oxide film.

7. A semiconductor target as claimed in claim 1, in which said light receiving surface of said substrate is covered with a reflection preventive film.

8. A semiconductor target for use in an image pickup tube for a color camera of the single valve type comprising:

a semiconductor substrate of a first conductivity type having a light receiving surface on one side thereof and an electron beam receiving surface on the other side thereof opposite said light receiving surface;

a plurality of semiconductor regions of a second conductivity type, opposite said first conductivity type, disposed in said semiconductor substrate at the electron beam receiving surface thereof; and means, coupled with said semiconductor substrate at a plurality of sets of respective adjacent portions of the surface of said substrate on the light receiving side thereof, for effecting respective relatively different decreases in the surface recombination of minority carriers created in said adjacent portions of the surface of said target substrate, when impinged by light on said light receiving surface of said substrate.

9. A semiconductor target as claimed in claim 8, wherein each set of said respective adjacent portions of the surface of said substrate is spaced apart from another set of adjacent portions.

10. A semiconductor target as claimed in claim 8, wherein said means comprises a plurality of sets of adjacent semiconductor regions, each set including a first semiconductor region of said first conductivity type, having a higher impurity concentration than that of said substrate, disposed in the light receiving surface of said substrate to a first prescribed depth, and a second semiconductor region of said first conductivity type, having a lower impurity concentration than said first semiconductor region, disposed adjacent and contiguous to said first region and extending from said light receiving surface of said substrate to a second prescribed depth.

11. A semiconductor target as claimed in claim 10, wherein the resistivity of said substrate is 10 Ω cm, said first region has an impurity concentration of $10^{19}$ atoms/cm$^{-3}$ and said second region has an impurity concentration of $10^{18}$ atoms/cm$^{-3}$.

12. A semiconductor target as claimed in claim 10, further including a film of insulating material selectively disposed on said light receiving surface of said substrate covering the exposed surface portions of said first regions of said sets.

13. A semiconductor target as claimed in claim 10, wherein each set of said respective adjacent portions of the surface of said substrate made up of said first and second regions is spaced apart from another set by a separating surface portion of said substrate therebetween which is contiguous to the first region of a set at one end thereof and to the second region of a set at the opposite end thereof.

14. A semiconductor target as claimed in claim 13, wherein said separating surface portions of said substrate and the second regions of said sets include a shallow layer of an impurity having said second conductivity type, so as to form pn junctions beneath said separating surface portions of said substrate and the second regions of said sets.

15. A semiconductor target as claimed in claim 10, wherein said second semiconductor region is disposed in a selected surface portion of said first semiconductor region.

16. A semiconductor target as claimed in claim 10, further including a reflection preventive film covering the entire surface of said substrate and said regions therein on the light receiving side of said substrate.

17. A semiconductor target as claimed in claim 8, further including a first layer of insulating material covering the light receiving surface of said substrate, and wherein said means comprises a plurality of sets of electrode layers overlying sets of adjacent surface portions of said substrate, each set including a first transparent electrode layer disposed on said first layer of insulating material overlying a first surface portion of said substrate for producing a first depletion layer in said first surface portion of said substrate therebeneath in response to a first selected voltage applied thereto, a second layer of insulating material disposed on said first layer of insulating material adjacent said first electrode layer so as to overlie a second surface portion of said substrate adjacent and contiguous to said first surface portion of said substrate, and a second transparent electrode layer disposed on said second layer of insulating material, so as to overlie said second surface portion of said substrate for producing a second depletion layer in said first surface portion of said substrate therebeneath in response to a second selected voltage applied thereto.

18. A semiconductor target as claimed in claim 17, in which each transparent electrode layer is formed from tin oxide ($SnO_2$).

19. A semiconductor target as claimed in claim 17, wherein each set of said respective adjacent portions of the surface of said substrate is spaced apart from another set of adjacent portions.

20. A semiconductor target as claimed in claim 19, wherein each set of said first and second electrode layers is spaced apart from another set by a separating surface portion of said substrate with respect to which said first and second electrode layers are absent.

21. A semiconductor target as claimed in claim 17, further including a plurality of additional semiconductor regions of said first conductivity type and having a higher impurity concentration than said substrate, respectively disposed in said substrate at the light receiving surface thereof beneath said sets of first and second electrode layers.

22. A semiconductor target as claimed in claim 17, further including an additional semiconductor region of said first conductivity type and having a higher impurity concentration than that of said substrate disposed in the entire light receiving surface of said substrate beneath said first layer of insulating material.

23. A semiconductor target as claimed in claim 17, wherein said second layer of insulating material is further disposed on said first electrode layer and said second electrode layer further overlies said first electrode layer.

24. A semiconductor target as claimed in claim 10, in which said first region has an impurity concentration profile having its maximum value at the light receiving surface of said substrate and decreasing gradually with depth, while the impurity concentration profile of said second region increases at first, reaches a peak point and then decreases gradually to the impurity concentration of said substrate, as measured from the light receiving surface of said substrate toward the surface scanned with an electron beam.

25. A semiconductor target as claimed in claim 24, in which said peak point lies at a position which is 0.1 to 0.5 micron deep from said light receiving surface of said substrate.

* * * * *